(12) United States Patent
Bacha et al.

(10) Patent No.: US 6,839,843 B1
(45) Date of Patent: *Jan. 4, 2005

(54) SYSTEM FOR ELECTRONIC REPOSITORY OF DATA ENFORCING ACCESS CONTROL ON DATA RETRIEVAL

(75) Inventors: Hanid Bacha, Great Falls, VA (US); Robert Bruce Carroll, Mount Kisco, NY (US); Lev Nirlas, Thornhill (CA); Sung Wei Tchao, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/459,239

(22) Filed: Dec. 10, 1999

(30) Foreign Application Priority Data

Dec. 23, 1998 (CA) .............................................. 2256934

(51) Int. Cl.[7] .................................................. H04L 9/00

(52) U.S. Cl. ....................................... 713/176; 380/258

(58) Field of Search ................................. 713/176, 156, 713/201, 155; 380/258, 281; 707/9, 103 R, 103 Z, 103 Y

(56) References Cited

U.S. PATENT DOCUMENTS 6,105,131 A * 8/2000 Carroll ........................ 713/155
6,181,336 B1 * 1/2001 Chiu et al. .................. 345/736

FOREIGN PATENT DOCUMENTS

| JP | 08-084141 | 3/1996 |
| JP | 08-263441 | 10/1996 |
| JP | 10-091427 | 4/1998 |
| JP | 10-124398 | 5/1998 |

OTHER PUBLICATIONS

Warwick Ford, Michael S. Baum, "Digital Signatures & Encripation" 1st Edition, Prentice Hall Press p82–96; p90–95; p259–288.

* cited by examiner

Primary Examiner—Kim Vu
Assistant Examiner—T. Truong
(74) Attorney, Agent, or Firm—Louis Herzberg

(57) ABSTRACT

When an electronic document is made available for review by other entities, it is often convenient to store the document in a repository or database managed by a third party. A system is provided in which the originator of the document is able to ensure the integrity and security of its document filed with a third party repository without having to trust the administrator of the repository. Both the document originator and the repository administrator have vault environments which are secure extensions of their respective work spaces. The vault of the document originator encrypts a document that it receives from the originator, prior to forwarding it on to the vault of the repository. On receipt of the encrypted document, the repository's vault signs the encrypted document itself before storing the document in the electronic repository and returns to the originator's vault proof of deposit of the encrypted document in the form of a copy of the signed encrypted document. An access control list identifying access ownership privileges for the document are also stored in the repository. Updates to the access control list are under the control of document originator, or another computer designated by the document originator. When a request is made to view the document, it is made from the vault of the requesting party (a secure extension of the requesting party's work space) to the repository's vault. The repository's vault retrieves a copy of the encrypted document which it forwards, along with the requestor's identity to the originator's vault. The originator's vault verifies that the access control is valid, then verifies that the requestor is authorized to view the document from the access control list, then decrypts the document and forwards the decrypted document directly to the requestor's vault. The requestor provides proof of receipt of the decrypted document.

18 Claims, 8 Drawing Sheets

SYSTEM FOR ELECTRONIC REPOSITORY OF DATA ENFORCING ACCESS CONTROL ON DATA RETRIEVAL

RELATED APPLICATION

U.S. Pat. No. 6,105,131, filed on Nov. 26, 1997, entitled "Secure Server and Method of Operation for a Distributed Information" and assigned to the same party as the present invention.

Copending application Ser. No. 09/459,240, filed on even date herewith, entitled "System for Electronic Repository of Data Enforcing Access Control on Data Search and Retrieval" and incorporated herein by reference.

FIELD OF THE INVENTION

The present invention is directed to the field of electronic data storage, and provides, in particular, a secure data repository and exchange system administered by a third party data custodian in which access control is enforced on data retrieval.

BACKGROUND OF THE INVENTION

Recent parallel advances in network communications and public key infrastructure ("PKI") technology have prompted businesses and institutions to begin to utilize electronic documentation for record-keeping and for transactions of all types. With improvements in transmission integrity and security, it can be confidently assumed that documents sent electronically over the Internet and other open networks will arrive intact and tamper-free. Database management systems coupled with modern computer memories capable of storing several gigabytes of data have made it practical for businesses and institutions to simply dispense with maintaining paper records whose bulk necessitates real estate costs.

Typically, data originating in one entity may have to be transmitted to others for any number of reasons such as deposit, review, etc. The data elements could be of the form of unstructured document files or structured records, such as bank account and other financial information. Using the example of unstructured data, it may be necessary to forward a document from the originating system to other computers in the same system or to computers residing on different systems for the purposes of review. This could occur equally in a business situation (e.g., a proposal for a joint venture or complex bid tender) as in an institutional setting (e.g., a graduate thesis to be reviewed by faculty advisers prior to submission to a university thesis review committee). The document has been created electronically since this will facilitate revisions and additions (particularly if it is lengthy) without having to retype the entire document each time.

Having the document in an electronic form also facilitates review of it because the document in this form is easily transmissible. However, rather than circulating the document, the document creator can let the intended reviewers know that it is available and provide them with access to it. To review the document, the authorized reviewers must be given access to the storage location of to the document.

There are a number of reasons why the document creator will not want to store the document locally. If local document storage means giving open access, behind its firewall, to other entities, a security risk (the threat of hackers) is created. Access into local storage also compromises data management, since one inadvertent action by a reviewer could erase the document file. Also, the lack of system and/or network availability may defeat any perceived convenience to reviewers in giving them direct access to the document in storage. System availability refers to whether the document originator's local machine or LAN is made available at all times to accommodate reviewers, while network availability refers to the constraint that it may be difficult for the network to make available multiple points to the local storage location if several reviewers seek access at one time.

There could also be reasons in a business or institutional situation that independent verification must be provided to show that a document originator has made its submission of a document on a certain date (e.g., a commercial tender).

One solution is to use the repository of a third party, particularly one in the business of providing the service of a secure data repository and who is able, if required, to provide proof of deposit.

U.S. Pat. Nos. 5,615,268 and 5,748,738, both entitled "System and Method for Electronic Transmission Storage and Retrieval of Authenticated Documents" and both assigned to Document Authentication Systems, Inc., describe a system which provides data integrity and non-repudiation assurance using a proprietary Windows client to communicate with the data repository service.

An important consideration not addressed in these patents is that the integrity and access to the data stored in the repository not be dependent on the actions of the third party that administers the document repository. In other words, the data custodian should not be able, through either inadvertent or malicious actions, to modify the contents of the data without that action being detected by the system users. Moreover, the data custodian should not be able to alter a user's privilege to, or restriction from, access to a data element.

In the above-described system of U.S. Pat. Nos. 5,615,268 and 5,748,738, the data repository service is trusted not to reveal data to other users. There is no provision in this system for data privacy using encryption technology.

SUMMARY OF THE INVENTION

Therefore, it is an object of the present invention to provide an electronic document storage and exchange system in which the documents are physically stored in a repository administered by a third party, but in which users have access to their documents and share them with each other.

It is also an object of the invention to provide a system in which the integrity and access to the data stored in the repository is not dependent on the actions of the third party administrator.

Accordingly, in one aspect, the present invention is directed to secure electronic data storage and retrieval system, that consists of a data repository, a repository manager for managing storage and retrieval of encrypted electronic data of a depositing computer into and out of the data repository, and an agent program of the depositing computer. The agent program is accessible to the repository manager whether the depositing computer is online or off-line. The agent program also has means to decrypt, on authentication of a requesting computer, the encrypted electronic data of the depositing computer retrieved from the data repository on request of the requesting computer. Preferably, the repository manager can digitally sign the encrypted electronic data prior to storage in the data repository, and then forward a copy of the signed encrypted data to the agent program, so that the agent program can verify against the signed encrypted data, the retrieved encrypted electronic data following decryption.

In another aspect, the present invention provides a system and method for securely authenticating user access to electronic data stored in a data repository managed by a repository manager unrelated to a source of the data, in which an access control list of user authorizations is associated with the electronic data when stored in the data repository. The source is responsible for updating the access control list, and maintains evidence of the current access control list. Evidence of the current access control list is also provided to any user computer which has effected the update. The source verifies that the updated access control list stored with the electronic data in the data repository is accurate before releasing the data to the requesting computer.

The use of the invention is particularly advantageous in a system having a large number of at documents accessible to and accessed by a large number of users. The centralization of user access information improves system efficiency since it avoids duplication of the information. Moreover, the use of a powerful, centralized search authority permits richer searching—parameters need not be limited to document identity, but could conceivably include other identifiers, such as creation time, identity of document originator, etc.

The invention may be realized in the form of media encoded with program code to effect the above-described system or processes.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

Figure 1:
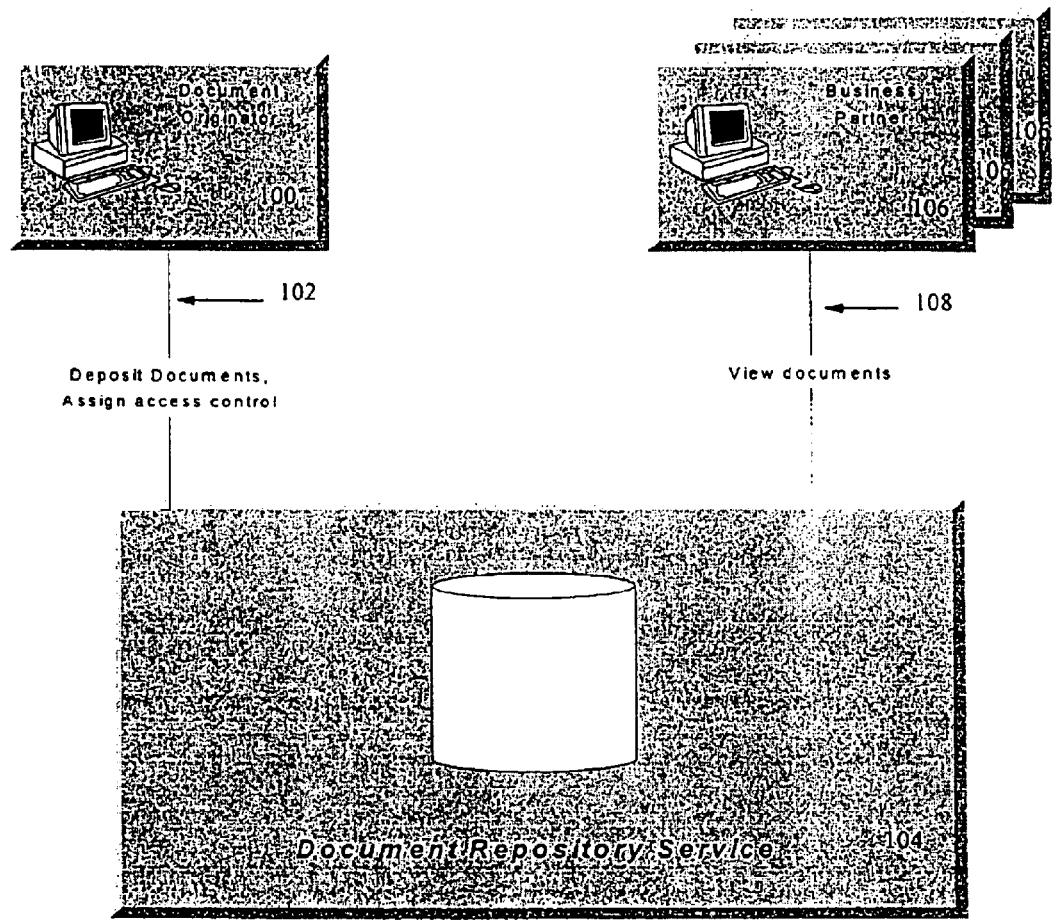
FIG. 1 is a schematic diagram of a document repository system utilizing a third party custodian.

A conventional arrangement for a document repository system utilizing a third party custodian is illustrated in FIG. 1. A document originator 100 can deposit documents via its connection 102 with a remote document repository service 104, such as a database, administered by a third party. As the owner of the deposited documents, the document originator 100 can assign access to the documents. For example, the document originator may assign a business partner 106 to have a "read" privilege, which means that the assigned business partner is allowed to retrieve the document via its connection 108 to the document repository service 104, but cannot make changes to the document on deposit.

In such conventional systems, the document deposited by the document originator 100 is normally not encrypted so that the business partner 106 will be able to review the document on demand. This is because there are problems associated with decrypting documents in the prior art. Document decryption requires access to the private key of the document originator 100. To give access to its private key, the document originator 100 must either make itself available online during all times that decryption might be requested in order to perform the decryption itself (the issue of system availability), or must set up a scheme in advance to make its private key available directly to the business partner 106 or through a trusted proxy (not shown).

U.S. Pat. No. 5,491,750 of International Business Machines Corporation, is for "Method and Apparatus for Three-Party Entity Authentication and Key Distribution Using Message Authentication Codes". This patent describes a system which allows for the distribution of secret session-management keys shared by two or more communication partners after the communication partners have been authenticated through a trusted intermediary. However, the keys generated under this scheme, and others like it, are short-lived and intended to be used as little as absolutely necessary. It is not clear that such a scheme would be appropriate to provide securely transmit decryption keys between communication partners in a document review system, with a persistent document repository.

Thus, in conventional systems where documents are deposited for a period of time and are not encrypted (FIG. 1), the third party administrator of the repository service 104 must be trusted with maintaining the integrity of the document.

The document repository system of the preferred embodiment of the present invention is built using the IBM Vault Registry product, the subject of U.S. patent application No. 980,022, titled "Secure Server and Method of Operation for a Distributed Information System", filed Nov. 26, 1997, assigned to IBM Corporation. U.S. patent application No. 980,022 is hereby incorporated herein by reference. The IBM Vault Registry product provides an enhanced web server environment that implements a secure extension, called a vault, of the client's environment. This system relies on the modern transmission technology described in the Background of the Invention, that electronic transmission of documents and other data will arrive intact and error free. Resources contained within a client's vault are available only when accessed from the client using strong authentication via certified public keys. Depending on the environment, access may be through the client's web browser.

The information content of the vault is encrypted for privacy. Each vault on a server has a unique encryption key and mechanisms that inhibit access to the keys except through the trust path approved by the owner of the vault, such as through a browser. Programs that run within a vault are isolated by operating system services to ensure such programs:

a) operate in a process with a system identity (a virtual logon) so that the identity is available to dependent processes without the possibility of alteration by a program operating in the vault;

b) have access to the data content of the vault in which they are running—but to no other;

c) are approved for running in the vault by the owner of the vault; and d) are signed to prevent tampering and "Trojan horse" attacks.

Programs operating in a vault can deposit information in the same vault or other vaults having secure access to each other's public keys. Normally, these vaults will be located on the same vault server, but can be on different vault servers with access to a common Certificate Authority to provide the public key information. In the context of a vault repository, "deposit" can mean different things. In one implementation, deposit can refer to encrypting the data in the encryption key of the target vault and signing the data in the signature key of the depositing vault. Vault programs cannot directly access either encryption or signature keys. This is done through an API. Optionally, the "deposit" function can place information in a queue contained in the target vault. Another option provides a "return receipt" that ensures that the information was deposited and that a program in the target vault opened the data. All of these "deposit" functions provide a means to pass information among vaults in such a way that:

a) their origin process cannot be denied;
b) their content cannot be viewed by those with the ability to inspect inter-process communication buffers; and
c) delivery is guaranteed.

If an application does not choose to queue data to the target vault, it can elect to store the information in a file, database or use any other system services that can treat the data as an "opaque" item (e.g., serializing it for object persistence). This opaque information can be managed by standard system techniques for the purpose of backup and recovery. However, its content can only be decrypted by a program running in the context of the vault that owns it using the SecureDepositor application programming interfaces.

Figure 2:
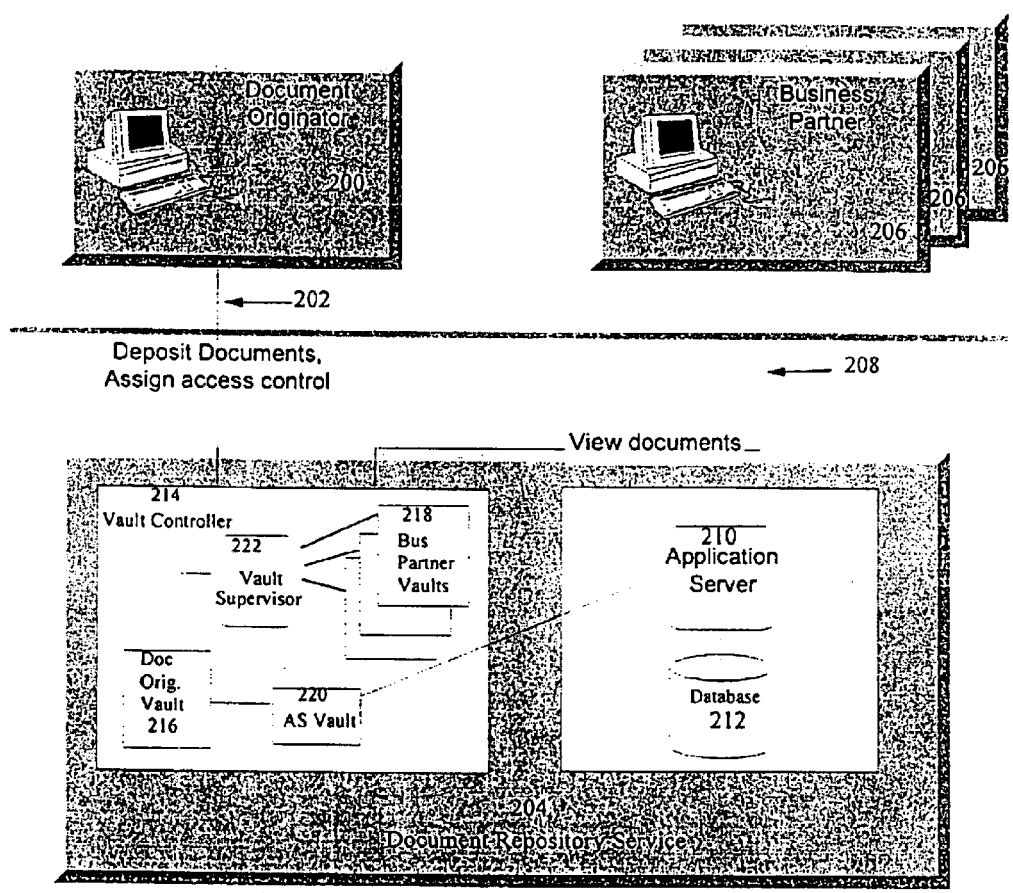
FIG. 2 is a schematic diagram, similar to FIG. 1, showing a vault document repository system utilized in the preferred embodiment of the present invention.

Using the IBM Vault Registry product, the preferred embodiment of the invention has been developed as illustrated schematically in FIG. 2.

As in the system of FIG. 1, in the scheme illustrated in FIG. 2 a document originator 200 can deposit documents via its connection 202 with a document repository service 204, and as the owner of the deposited documents, can assign levels of access to the documents to third parties 206, such as business partners, who gain access to the documents in the document repository service 204 via their own network connections 208. However, unlike the system described above, users of the document repository system are not obliged to trust the third party to maintain the integrity of documents filed in the repository.

The document repository system 204 of the preferred embodiment comprises two components, an application server 210 and a vault controller 214. The application server (AS) is a program to administer the database repository 212, which may be on the same machine or may be remotely located on a closed network. The vault controller 214 includes a number of components, user vaults 216, 218 which are assigned on an individual basis to document originators 200 and business partners 206, an AS vault 220 assigned to the application server 210, and a vault supervisor program 222.

A user vault 216 or 218 can be accessed only by the user (document originator 200 or business partner 206) to whom the vault has been assigned, upon proper authentication. The individual vaults do not have direct access to the document database 212, access is through the AS vault 220 and the application server 210.

The application server component 210 does not run on a trusted computing base, but can execute on any platform. The application server has a reciprocating component which runs in the AS vault 220 assigned to it in the vault server 214. The AS vault 220 can communicate with the application server 210, and through the application server, has access to the document database 212.

Figure 3:
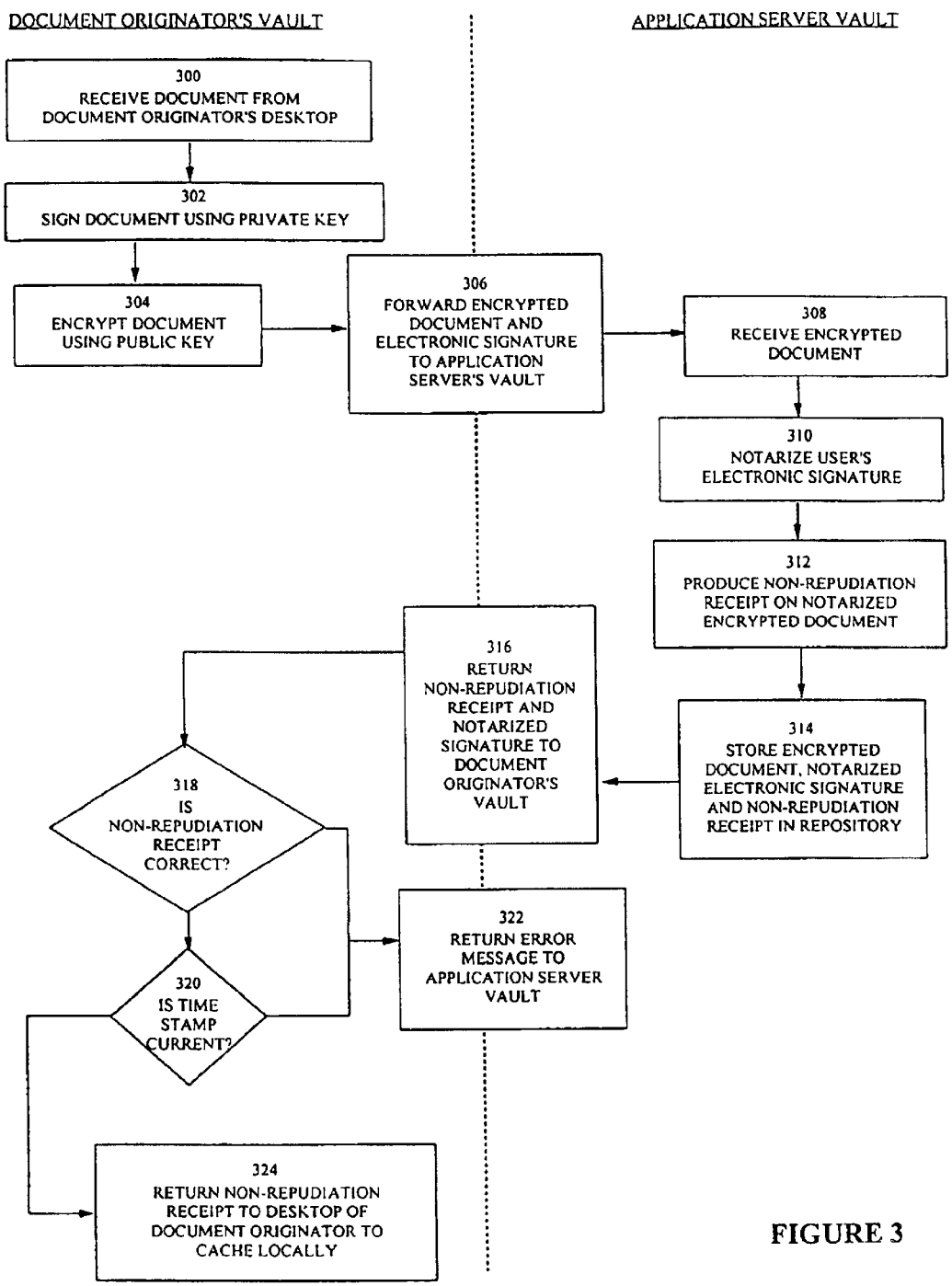
FIG. 3 is a flow diagram illustrating the process of document creation, according to the invention.

FIG. 3 is a flow diagram illustrating the process of document creation, according to the preferred embodiment of the invention. Using the IBM Vault Registry environment, a personal vault is notionally a secure extension of the vault owner's environment. Thus, the interaction between the process steps in FIG. 3 are shown between the vaults of the document originator and the application server.

When creating a document in the data repository, the document is first sent from the desktop of the user who created or originated it, to the user's (document originator's) personal vault (block 300), where the document is "signed" with the user vault's private signing key (block 302). An electronic signature of a data element is a guarantee, provided by the signatory, of the integrity of that data element. A signature may be computed by first computing the data element's digest. The digest is a relatively small structure (e.g. 128 bits for MD2 or MD5 digest) with specific properties to guarantee security. First, it is a one-way function, which means that given a digest, it is impossible to obtain the original document that produced it. In addition, given a digest, it is impossible (or computationally infeasible) to find a second pre-image, which would have the same digest. The digest is also collision-resistant. This means that two different pre-images are highly unlikely to produce the same digest.

The data element's digest is then encrypted with the user vault application's private signing key (block 304). In the preferred embodiment, both symmetric and public-key asymmetric cryptography technology are utilized.

With public key cryptography, an application has two keys, a public key and a private key, referred to as a key pair. The private key is held locally by the application, and is discussed in further detail below. The public key is made available to all users, usually through a directory service, such as X.500 distributed directory. Public key distribution is well known in the art, and is not discussed in further detail in the present specification.

When public key cryptography is used, a data element encrypted with the public key may only be decrypted with the corresponding private key. Similarly, a data element encrypted with the private key may only be decrypted with the public key.

In symmetric key technology, a single key is used for both encryption and decryption. In current practice, encryption/decryption and key generation are much faster in symmetric key technology than with public-key asymmetric technology.

Data is normally encrypted using a randomly generated symmetric key. Then, the symmetric key is itself encrypted using the user's public encryption key, and is stored with the document so that it becomes part of the document.

Continuing with FIG. 3, the encrypted document and the electronic signature are forwarded to the application server's vault for filing in the document database (block 306). On receiving the encrypted document (block 308), the application running in the application server's vault notarizes the signature (block 310) by re-signing it with its own private signing key.

The notarization of a signature, in an electronic context, means that a third party, which acts as a "notary", certifies the content of a signature. (All of the duties attending the legal office of notary, as conferred by a government authority, are not intended to be covered by the references in this specification to "notary" and "notarization".) In general, electronic notarization of a signature is done as an extra precaution, in order to prevent unauthorized modification of the signature at a later time. In the case of the present invention, notarization of the user's digital signature prevents the user from replacing or modifying the original document in the document repository. A check of the notarized signature associated with the document would reveal any inconsistencies.

A notarized electronic signature contains two pieces of information, the originator's signature of the given data element and the notary's signature of the originator's signature. The notary's signature should be computed over the originator's signature and the current time stamp.

The application running in the application server's vault then signs the document it has received (block 312). Because the data it receives from the document originator is encrypted, the application server actually has no knowledge of the contents of the document. Therefore, according to the invention, this second signature is computed over the encrypted document, and the originator's notarized signature. The application server's signature constitutes a non-repudiation receipt, providing proof to the document originator (depositor) that the repository service received the document. The creation of the document in the repository may then not be denied later by the repository service.

The encrypted document, the document originator's notarized signature, and the non-repudiation receipt are all stored in the application server's repository or the application database (block 314). The non-repudiation receipt is sent to the vault of the document originator (block 316), the vault of the document originator checks the correctness of the non-repudiation receipt (block 318) by verifying the signature of the encrypted document. The document originator's vault also checks the currency of the time stamp in the notarized signature (block 320). The tolerance for the time stamp is application dependent. If either of these tests fail, an error message is returned to the AS vault (block 322) and logged in the system. If the receipt is correct and current, the application running the user's vault returns the non-repudiation receipt to the originating user (block 324) to be cached locally for future reference, in the event proof is required that the document has been stored in the repository.

It is possible that the document originator may sign and/or encrypt the document using his own proprietary technique, before submitting it to his vault for storage. However, the document repository is not sensitive to the content of the document being stored. Hence, an encrypted document will be re-signed and re-encrypted by the user's vault, as any other document would be handled.

Figure 4A:
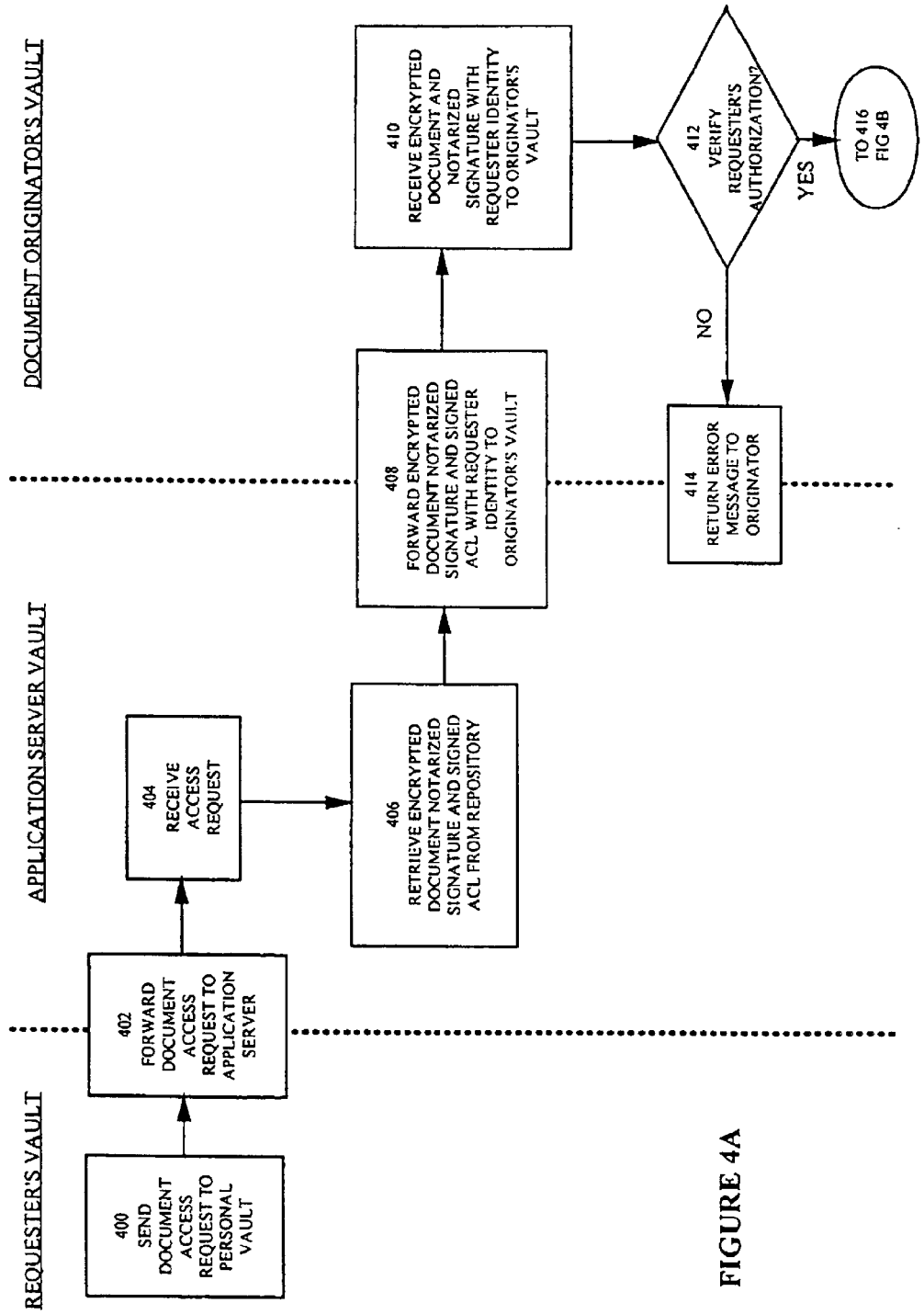
FIGS. 4A and 4B, contain a flow diagram illustrating the process of document retrieval according to the invention.
Figure 4B:
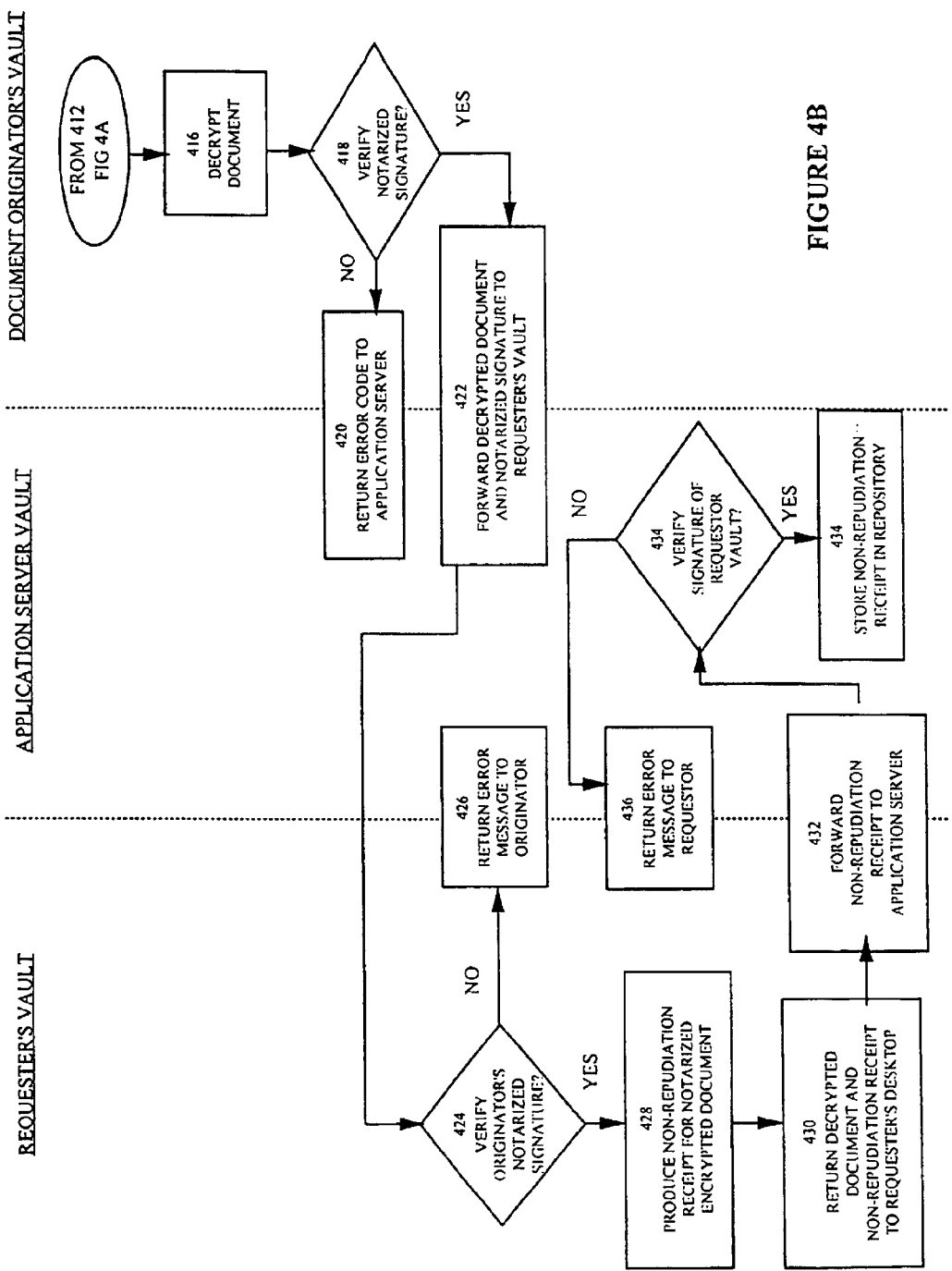

FIGS. 4A and 4B contain a flow diagram illustrating the steps, according to the preferred embodiment of the invention, which must take place to permit a document to be retrieved by a requester who has been authorized under a type of manifest maintained by the document originator for each document called an access control list (ACL). As in FIG. 3, the process steps have been divided between the three actors, user, application server and requester, on the basis that the personal vaults of each are notional secure extensions of their respective work spaces.

As in FIG. 3, the process steps shown in FIG. 4 are the actions and interactions between the vaults of the document originator, application server and requestor, on the basis that the personal vaults of each are notional secure extensions of their respective work spaces, as provided in the IBM Vault Registry product or an environment with similar properties.

Beginning with FIG. 4A, the requestor makes a request to his vault application to retrieve a document from the application server repository (block 400), and the requestor's vault application, in turn, forwards the request for the document to the application server's vault (block 402).

The application server's vault application receives the access request (block 404) and retrieves the encrypted document, the originator's notarized signature and the signed ACL from the application database (block 406).

The application server's vault application sends the encrypted document, the notarized signature and the signed ACL to the vault of the document originator. The application server's vault also sends the requestor's identity vault to the originator's vault (block 408).

The originator's vault checks that the requestor is authorized to retrieve the document (block 412). Document access control is enabled, in the preferred embodiment, through access control lists used to restrict document access only to authorized entities. An access control list is associated with a document and must be checked when a requestor sends a request to retrieve a document. A requestor will only be given a copy of the document if it has access. The requestor can verify access in advance of making a request if capability lists are used. If the requester is not authorized to access the document, an error message is returned to the originator and is logged in the system (block 414).

Continuing with FIG. 4B, if the requestor is authorized to receive the document, the originator's vault application decrypts the document (block 416) and verifies the notarized signature (block 418). Since the originator's original signature was computed over the unencrypted document contents, only those users with access to the document contents are able to verify the signature. If the received signature does not correspond with the decrypted document, then it will be clear that it is not the same version of the document as deposited, and the originator will return an error message to the application server (block 420).

If the signature is verified, the originator forwards the decrypted document and the notarized signature to the requestor's vault (block 422).

On receipt of the decrypted document, the requestors vault application attempts to verify the originator's notarized signature using the notary's public signature key (block 424). If the requestor is unable to verify it, an error message is returned to the originator and logged in the system (block 426).

If the originator's notarized signature can be verified, the requestor's vault signs the notarized signature that it received with the document. This signature is computed over the notarized signature, as well as the current time stamp, and constitutes a delivery receipt (block 428) proving that the document was retrieved from the repository. The requestor's vault returns the decrypted document along with the non-repudiation receipt it has generated to the requestor's desktop (block 430). The requestor's vault also forwards the non-repudiation receipt to the application server's vault (block 432). The application server verifies the signature of the requester vault on the receipt (block 434). If the signature does not correspond to the document, the receipt is marked as incorrect or as "missing receipt", and is cached, if the application includes this storage function (block 436). If the signature can be verified, the application server vault stores the receipt in the application database as proof that the requestor did retrieve the document (block 438).

Immutability of Access Control for Document Retrieval

As discussed above, in a data repository, there is a requirement for document access control. This means that only those users authorized by the document's owner, are able to view the document, and that document access permissions may only be modified by the document's owner (i.e., the document originator) and those other users that have been authorized by the document's owner to modify the given document's access control list. It is important to have assurance that even the repository administrator does not have the power to modify a document's access permissions without authorization from the document's owner.

There are two different types of application requirements for establishing the immutability of document access control. Document access should be checked:
1) when a user performs a search to find all documents that it is authorized to view; and
2) when a user performs an actual retrieval of a document.

All applications must enforce access control on document retrieval (access type 2 above). For this type of access, the repository must guarantee that the access control of a document cannot possibly be modified by an unauthorized user, such as a business competitor.

Some applications must also enforce access control on document search, particularly in situations where users have no means to determine which documents they have been granted access, except through the application server of the repository. A system that enforces immutability of access control on both document search and retrieval is the subject matter of our concurrently filed application titled "System for Electronic Repository of Data Enforcing Access Control on Data Search and Retrieval".

In some applications it is not essential for a user to be able to query the document repository for all documents that it is authorized to see. For example, this knowledge may be communicated off-line through business meetings, by e-mail or over the telephone. In such a case, the user already knows what documents it has access to, and therefore, the requestor's knowledge of its own document access cannot be affected by actions of the repository.

Figure 5:
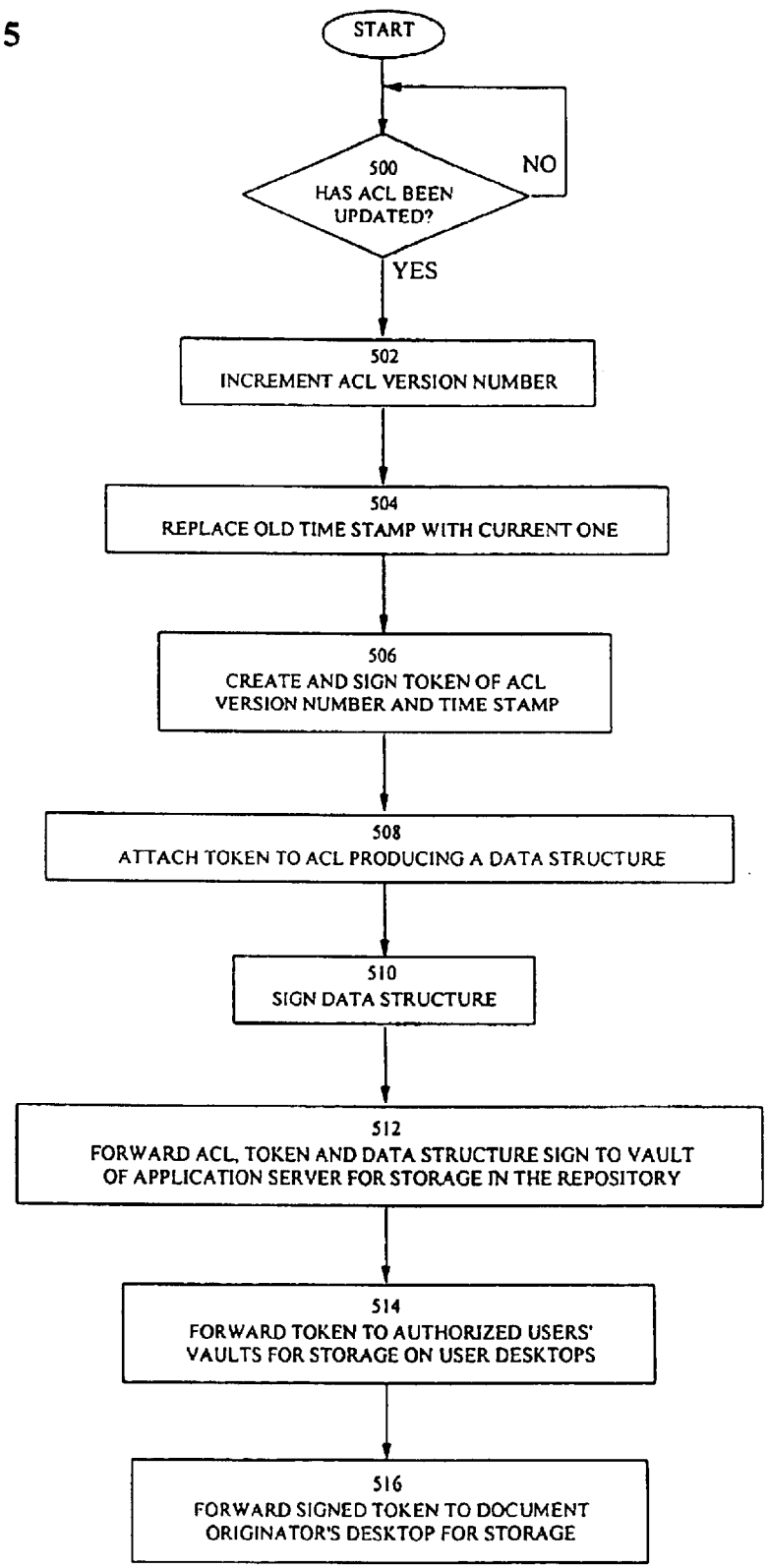
FIG. 5 is a flow diagram showing a process, according to the preferred embodiment of the invention, for providing immutability of access control for document retrieval.

In the preferred embodiment, each document has, associated with it, an access control list (ACL) which identifies the access authorization to the document for different users. In order to guarantee immutability, each ACL is processed in the document originator's vault as illustrated in FIG. 5.

Each ACL is associated with a version number and a time stamp of its latest modification. When an ACL is updated (block 500), its version number is incremented (block 502) and the old time stamp associated with the ACL is replaced with the most current time stamp (block 504). A token, which is intended to guarantee the immutability of the ACL, is created from the current version number and time stamp now associated with the ACL. The token is signed by the document originator's vault (block 506). A data structure, such as a text string or binary structure, is produced by attaching the token to the ACL (block 508). The data structure is signed by the owner's vault to eliminate the possibility of it being substituted (block 510), and forwarded, together with the ACL and token, to the AS vault for storage in the document repository (block 512).

The ACL token is also forwarded to the vault of any user with authorized access to the document, for storage with the user's access application on its desktop (block 514) for future ACL verification. The signed token is forwarded to the document originator's desktop for storage (block 516). Because it is holding a copy of the signed token, the document originator becomes the final arbiter of whether the document ACL is up-to-date or not.

When a business partner wants to retrieve a document, the AS vault application sends the encrypted document to the originator's vault as described above (block 408 of FIG. 4A). Together with the document, the notarized signature, and the requester's ID, the AS vault will also send to the originator's vault the signed ACL. In order to verify the requestor's authorization (block 412 of FIG. 4A), the originator's vault then performs the following checks:
1. verifies the correctness of the ACL signature;
2. verifies that the version number and time stamp match what's stored inside the originator's vault; and
3. checks in the verified ACL that the requester has access to the indicated document.

With this technique, nobody can modify the ACL stored in the application database, without that change being detected by the originator's vault.

As described above, each user which owns documents in the repository, keeps on its desktop the signed tokens of the correct version of each ACL. The ACL versions kept by the user's vault are verified by comparing the signed token stored on the user's desktop with the one stored in the user's vault. This comparison can be performed at different times; one good opportunity to verify the ACLs stored inside a user's vault is during logon, so that every time the user logs on, the user's ACLs are verified.

If ACL verification fails, the user's vault application can automatically stop honoring all requests to retrieve the document protected by the ACL. This state of document inaccessibility would persist until the user either creates a new ACL, or re-certifies the existing ACL. The process of re-certification of the existing ACL would include synchronizing the ACL token stored in the user's vault with the token stored on the user's desktop.

In this embodiment, the actual ACL is stored in the application database. If a user wants to perform a search of documents he is authorized to, this search can only be performed by application server's vault application, the only program with direct access to the application database. However, any misinformation by a "malicious" application server about a user's access rights to a document can be checked. The application server does not have access to the signed ACL token on the user's workstation or in the user's vault. The user will discover that its token does not correspond with the information received from the application server the next time the user verifies the token (see Back-up and Recovery section below). This will be particularly useful in a system designed in such a way that access to a document can only be granted, but not later removed.

Assignment of Ownership Privileges

Some environments require that a document originator be able to allow someone else to modify the access list of the given document. For example, if the owner is not available, another authorized user will have the ability to update the given document's access control.

Figure 6:
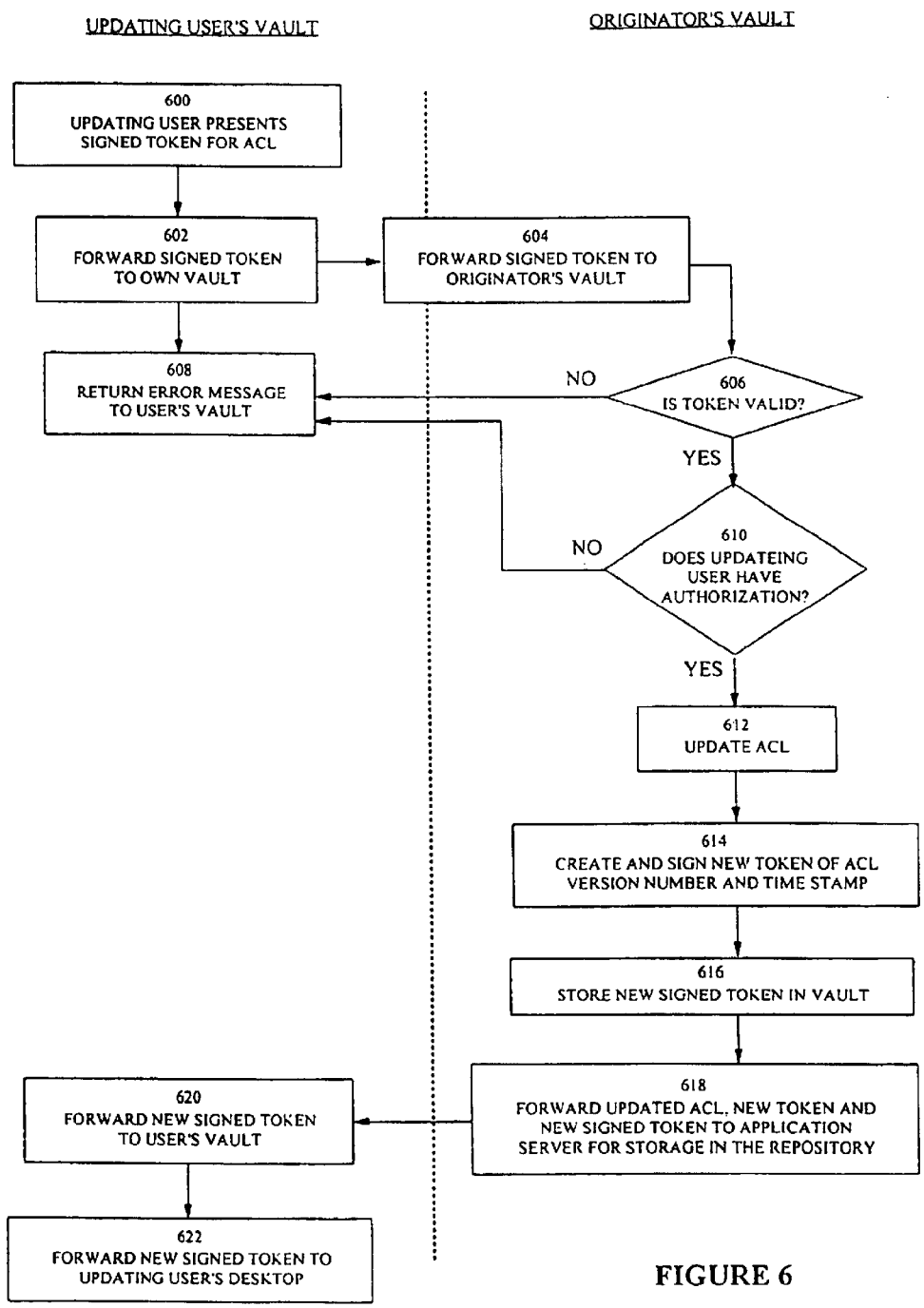
FIG. 6 is a flow diagram illustrating a process for assigning ownership privileges over stored documents, according to the invention.

According to a preferred embodiment of the invention, this function can be implemented as illustrated in FIG. 6. When ACL update is attempted, the updating user must be able to present the up-to-date signed token for the ACL (block 600). The signed token is sent to the updating user's own vault (block 602) which passes the signed token to the originator's vault (block 604). The originator's vault checks the validity of the token (block 606) by comparing it with the signed token it has in its own storage. The originator's vault also checks the authority of the updating user (block 610).

If the token is invalid or the updating user does not have ownership privileges assigned in the ACL of this document, then the document originator's vault will detect this, refuse the update and return an error message to the user's vault (blocks 608).

If the originator's vault can verify the signing user's access to the document, and that the version number, and time stamp of the ACL token are current (block 706), the ACL is updated (block 710) and a new token is generated and signed (block 712), and stored in the originator's vault (block 714). The new signed token is sent to the updater's vault (block 716). The updater's vault returns the new token to the updater's desktop for storage (block 718). The new signed token may also, optionally, be forwarded to the application server's vault for storage in the repository (block 720).

This procedure requires that only one person may perform an ACL update at any given time. For example, if a document originator John will be leaving for vacation, he can permit a co-worker, Mary, to update the ACL of his document in his absence from the office by giving Mary his up-to-date token for the ACL of the document. Mary then issues an ACL update by presenting the token through her vault to John's vault. Mary receives the new signed token for the ACL which she returns to John on his return to the office. After installing the new token, John can issue his own ACL update.

Data Backup and Recovery

Occasionally it may be necessary for the administrator of the document repository to restore the document database from a previous backup. This may be necessary, for example, in case of a catastrophic database failure, such as a disk crash. The data that needs to be included in a backup are the documents themselves, the ACLs (whether stored in the application database or in the owner's vaults), the capability lists (for the systems the implement them, as described above), and the verification tokens of ACLs and capability lists.

Following a data restoration, updates made after the most recent backup may be lost. For the purposes of the present invention, this could include ACL and capability list updates. When this occurs, the verification tokens stored on user desktops may not correspond with the tokens in the corresponding vaults, denying users proper access.

Therefore, the following system has been implemented to provide a standard for data restoration in different situations. It is assumed that the backup was taken at TIME1, while the restoration occurred at a later TIME2 based on the state of the data at TIME1 that the requestor did retrieve the document.

Where a complete data restore of the document database, ACLs, capability lists and corresponding tokens stored in the vaults is performed, users authorized to access a document before TIME1, can also access it after TIME2. This means that if a user was authorized before TIME1, but the authority was revoked after TIME1 but before TIME2, the user will have document access until the document owner performs a check of the ACL token. All users should therefore do an ACL and capability list check following a compete data restoration.

Where only the document database was restored, while the ACLs, the capability lists and the vault-stored tokens are untouched, users may find that they are authorized to access a document which does not exist in the database because the document has been added after TIME1, but subsequently lost in the database restore. Since all tokens are up-to-date, no other anomalies will occur.

Another case involves a system in which capability lists are not used, but the ACLs are stored in the application database. Where the document database and the ACL have been restored, while the vault-stored tokens have not, users will find that all documents whose ACL changed after TIME1 are inaccessible. This is because the ACL tokens in the application database do not match the tokens stored in the individual owners' vaults. To deal with this, all document originators will have to update the ACLs. One way to do this is for the administrator to send the old ACLs (which were in effect at TIME1) to document originators, and ask them to re-install the corresponding tokens in their vaults. This update would be manual, not automatic, and an owner's documents would be inaccessible until the owner has performed the update.

For situations where database inconsistencies must be avoided, the repository administrator may disable access to all documents after a restore, until the originator takes corrective action. This disabling of access may apply to all documents stored in the repository, or to only a subset of the documents, whose consistency is the most critical. In this case, the repository administrator must be relied upon to preserve consistency of the system. However, as described above, the administrator in any case does not have the power to grant or revoke users' access to a document.

In order to minimize the ability of orchestrated attack on the system, it is important to separate the roles between the administrator of the vault server and the corresponding local vault storage, on the one hand, and the database administrator, on the other.

Figure 7:
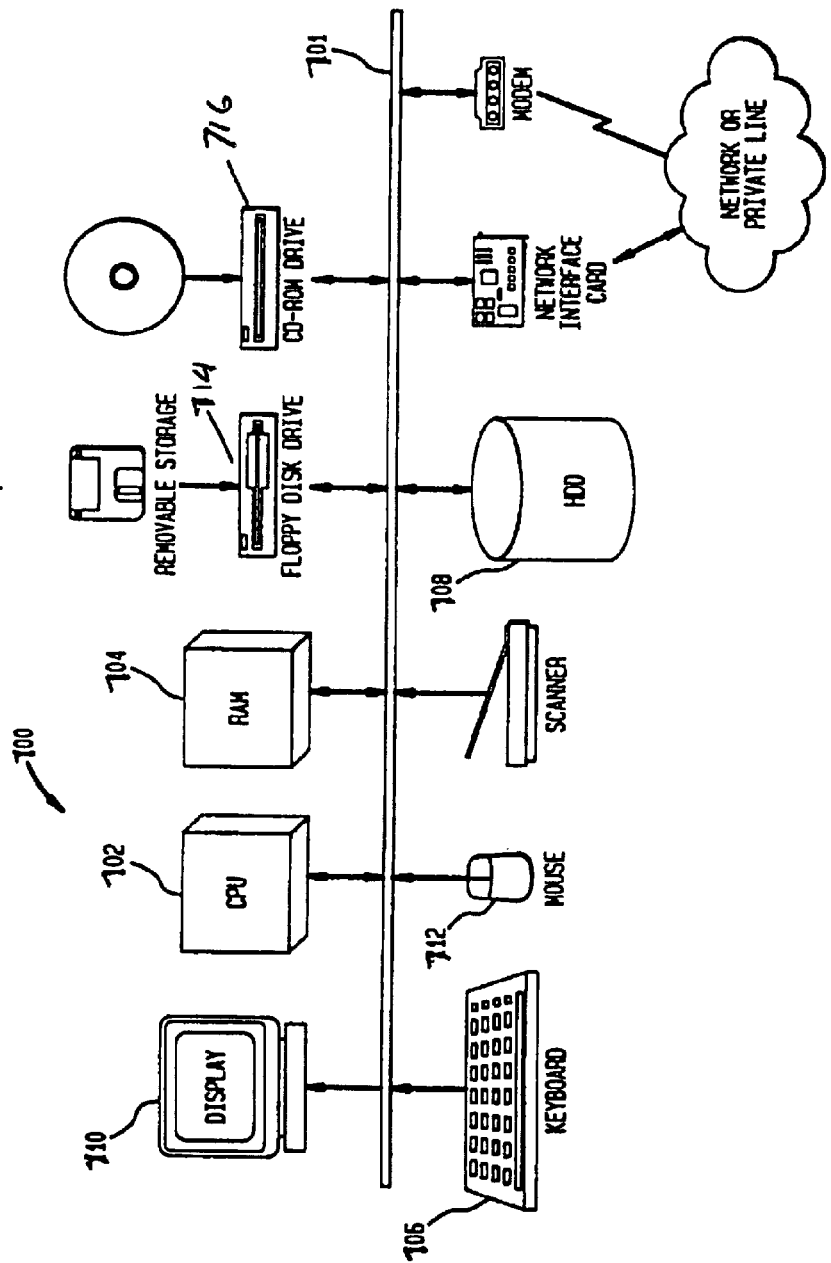
FIG. 7 is a block diagram of a computer system for use with the present invention.

The present invention can be used on any properly configured general purpose computer system, such as the one shown in FIG. 7. Such a computer system 700 includes a processing unit (CPU) 702 connected by a bus 701 to a random access memory 704, a high density storage device 708, a keyboard 706, a display 710 and a mouse 712. In addition, there is a floppy disk drive 714 and a CD-ROM drive 716 for entry of data and software, including software embodying the present invention, into the system on removable storage. An example of such a computer is an IBM Personal computer of the International Business Machines Corporation, such as an Aptiva personal computer operating on Microsoft Windows 98 operating system of the Microsoft Corporation. Also in this example there is an internet browser capable at running Java such as Netscape Navigator, e.g., Netscape Communications Corporation, Internet Explorer, e.g., Microsoft Corporation.

Preferred embodiments of the invention implemented by means of the IBM Vault Registry product have been described. However, it will be obvious to the person skilled in the art that the present invention could be implemented using other products that provide similar functions, such as secure vault-like environments located locally with each user's desktop. Modifications of this nature and others that would be obvious to the person skilled in the art are intended to be covered by the scope of the appended claims.

We claim:

1. A secure electron data storage and retrieval system with the electronic data stored therein maintained secure from the repository manager, comprising:

a data repository;

a repository manager for managing storage and retrieval of encrypted electronic data of a deposing computer into and out of the data repository;

an agent program of the depositing computer, accessible to the repository manager whether the depositing computer is online or off-line, the agent program having means in an environment secure from the repository manager to decrypt, on authentication of a requesting computer, the encrypted electronic data of the depositing computer retrieved from the data repository on request of the requesting computer;

where the repository manager is further adapted to digitally sign the encrypted electronic prior to storage in the data repository, and to forward a copy of the signed encrypted data to the agent program of the depositing computer, and wherein the agent program of the depositing computer is adapted to verify in the environment secure from the repository manager against the signed encrypted data, the retrieved encrypted electronic following decryption; and where the agent program is further adapted to forward the decrypted electronic data directly from the environment secure from the repository manager to the requesting computer without providing access to the repository manager.

2. The system, according to claim 1, wherein the agent program is a secure extension of the deposing computer and is adapted to manage communications between the depositing computer and the repository manager.

3. The system, according to claim 2, further comprising a server having communication links with the repository manager, the depositing computer and the requesting computer, the server housing:

the agent program of the depositing computer and the environment secure from the repository manger;

a second environment comprising a secure extension of the repository manager, said second environment adapted to manage communications to and from other environments on the server with the repository manager and at least a third environment comprising a secure extension of the requesting computer, said third environment adapted to manage commutations to and from other environments on the server with the requesting computer.

4. The system, according to claim 3, wherein the agent program of the depositing computer comprises means to crypt and dilly sign electronic data received tom the depositing computer, and to forward the encrypted electronic data and signature to the repository manager for storage in the depositing computers data repository.

5. A process for authenticating user access to electronic data stored in a data repository secure from a repository manager unrelated to a source of the electronic data, comprising:

associating an access control list of user authorizations with the electronic data when stored in the data repository in an environment secure from the repository manager;

effecting updates to the access control list only from the source of the electronic data;

storing the updated access control list with the electronic data stored in the data repository in an environment secure from the repository manager;

storing evidence of the updated access control list at the source of the electronic data and at any use computer to have effected the update;

verifying accuracy of the updated access control list stored with the electronic data in the data repository with the evidence stored at the source before releasing the electronic data to a requesting authorized user;

identifying a revision level of the updated access control list;

associating a current time stop with the updated access control list, where the step of storing evidence comprises:

creating a token of the revision level and current time stamp;

storing the token at every with access to the electronic data in the data repository;

attaching the token to the updated access control list to form a data structure;

digitally signing the data structure;

storing the singed data structure with the updated access control list in the data repository and at the source; and where the step of verifying accuracy of the updated access control list compromises:

verifying decrypting the data repository and at the source; and comparing the verified data structure with the updated access control list retrieved from the data repository.

6. The process of claim 5, wherein the step of storing evidence further comprises:

digitally signaling the token; and storing the signed token at the source.

7. The process of claim 6, further comprising:

forwarding the digitally signed token to a user authorized by the source to update the access control list; and on presentation of the digitally signed token by the user authorized to update the access control list;

verifying the token signature at the source; and comparing the verified token with the revision level and current time stamp associated with the updated access control list retrieved from the data repository.

8. A process for secure storage and retrieval of electronic data in a rite data repository, comprising:

digitally signaling the electronic data at a source;

encrypting the electronic data at the source;

forwarding the encrypted electronic data to the data repository;

digitally signing the encrypted electronic data at the data repository to produce a deposit receipt;

storing the encrypted electronic data and deposit receipt in the data repository in an environment fee of access by the data repository manager;

returning a copy of the deposit receipt to the source;

receiving a request from a requesting user, for access to the stored electronic data;

retrieving the encrypted electronic data and forwarding the retrieved data to the source;

verifying the requesting user as authorized to access the electronic data; and if verified, decrypting the retrieved data by the source and sending it directly to the requesting user without providing access to the data by the repository manager.

9. The process, according to claim 8, further comprising:

associating an access control list of user authorizations with the electronic data when stored in the data repository in the environment free of access by the depository manager;

effecting updates to the access control only list from the source of the electronic data;

storing the updated access control list with the electronic data stored in the data repository; and storing evidence of the updated access control list at the source and at every user with authorized access to the electronic data in the data repository in areas free form access by the depository manager.

10. The process, according to claim 9, wherein the step of verifying the requesting user as authorized comprises locating the requesting user on the updated access control list.

11. The process, according to claim 10, further comprising the step of verifying accuracy of the idated access control list stored with the electronic data in the data repository with the evidence stored at the source before releasing the electronic data to the requesting user.

12. A computer program product on a computer usable medium for authenticating user access to electronic data stored in a data repository secure from a repository manager unrelated to a source of the electronic data, said computer program product comprising:
   computer software for associating an access control list of user authorizations with the electronic data when stored in the data repository in an environment secure from the repository manager;
   computer software for effecting updates to the access control list from the source of electronic data;
   computer software for storing the updated access control list with the electronic data stored in the data repository in an environment secure from the repository manager;
   computer software for storing the evidence of the updated access control list at the source of the electronic data and at any user computer to have effected the update;
   computer software for verifying accuracy of the updated access control list stored with the electronic data in the data repository with the evidence stored at the source before releasing the electronic data to a requesting authorized user;
   where the computer software for effecting updates to the access control list comprises:
      computer software for identifying a revision level of the updated access control list; and
      computer software for associating a current time stamp with the updated access control list; and
   where the step of storing evidence comprises:
      computer software for creating a token of the revision level and current time stamp; and
      computer software for storing the token at every user with access to the electronic data in the data repository;
      computer software for attaching the token to the updated access control list to form a data structure;
   computer software for digitally the signing the data structure
   computer software for storing the signed data structure with the updated access control list in the data repository and at the source; and
   where the software for verifying accuracy of the updated access control list comprises;
      computer software for verifying decrypting the data structure signature at the source; and
      computer software for comparing the verified data structure with the updated access control list retrieved from data repository.

13. The program product of claim 12, wherein the computer software for storing evidence further comprises:
   computer software for digitally signing the token; and
   computer software for storing the signed token at the source.

14. The program product of claim 13, further comprising:
   computer software for forwarding the digitally signed token to a user authorized by the source to update the access control list, and
   on presentation of the digitally signed token by the user authorized to update the access control list
   verifying the token signature at the source, and
   comparing the verified token with the revision level and current time stamp associated hit the updated access control list retrieved from the data repository.

15. The computer program product according to claim 12, further comprising:
   computer software for associating an access, control list of user authorizations with the electronic data when stored in the data repository in an environment free of access by the depository manager;
   computer software for effecting updates to the access control list only from the source of the electronic data;
   computer software for storing the updated access control list with the electronic data stored in the data repository; and
   computer software for storing evidence of the updated access cool list at the source and at every user with authorized access to the electronic data in the data repository in areas free from access by the depository manager.

16. The computer program product according to claim 15 wherein the computer software for verifying the requesting user as authorized comprises computer software for locating the requesting user on the updated access control list.

17. The computer program product according to clam 16, further comprising computer software for verifying accuracy of the updated access control list stored with the electronic data in the data repository with the evidence stored at the source before releasing the electronic data to the requesting user.

18. A computer program Product on a computer for secure storage and retrieval of electronic dam in a remote data repository, comprising:
   computer software for digitally signing the electronic data at a source;
   computer software for encrypting the electronic data at the source;
   computer software for forwarding the encrypted electronic data to the data repository;
   computer software for storing the encrypted electronic data and deposit receipt in the data repository in an environment free of access by the data depository manager;
   computer software for returning a copy of the deposit receipt to the source;
   computer software for receiving a request from a requesting user, for access to the stored electronic data;
   computer software for retrieving the encrypted electronic data and forwarding the retrieved data the source;
   computer software for verifying the requesting user as authorized to access the electronic data; and
   computer software at the source for decrypting the retrieved data when verified and sending it directly to the requesting user without providing access to the data repository manager.

* * * * *

UNITED STATES PATENT AND TRADEMARK OFFICE
CERTIFICATE OF CORRECTION

PATENT NO. : 6,839,843 B1
DATED : January 4, 2005
INVENTOR(S) : Hamid Bacha et al.

It is certified that error appears in the above-identified patent and that said Letters Patent is hereby corrected as shown below:

<u>Title page,</u>
Item [75], Inventors, first and third should read as follows:
-- Hamid Bacha
Lev Mirlas --

Signed and Sealed this

Fifth Day of April, 2005

JON W. DUDAS
*Director of the United States Patent and Trademark Office*